(No Model.)
S. M. LILLIE.
UTILIZING THE WASTE HEAT OF FURNACES.
No. 339,669. Patented Apr. 13, 1886.
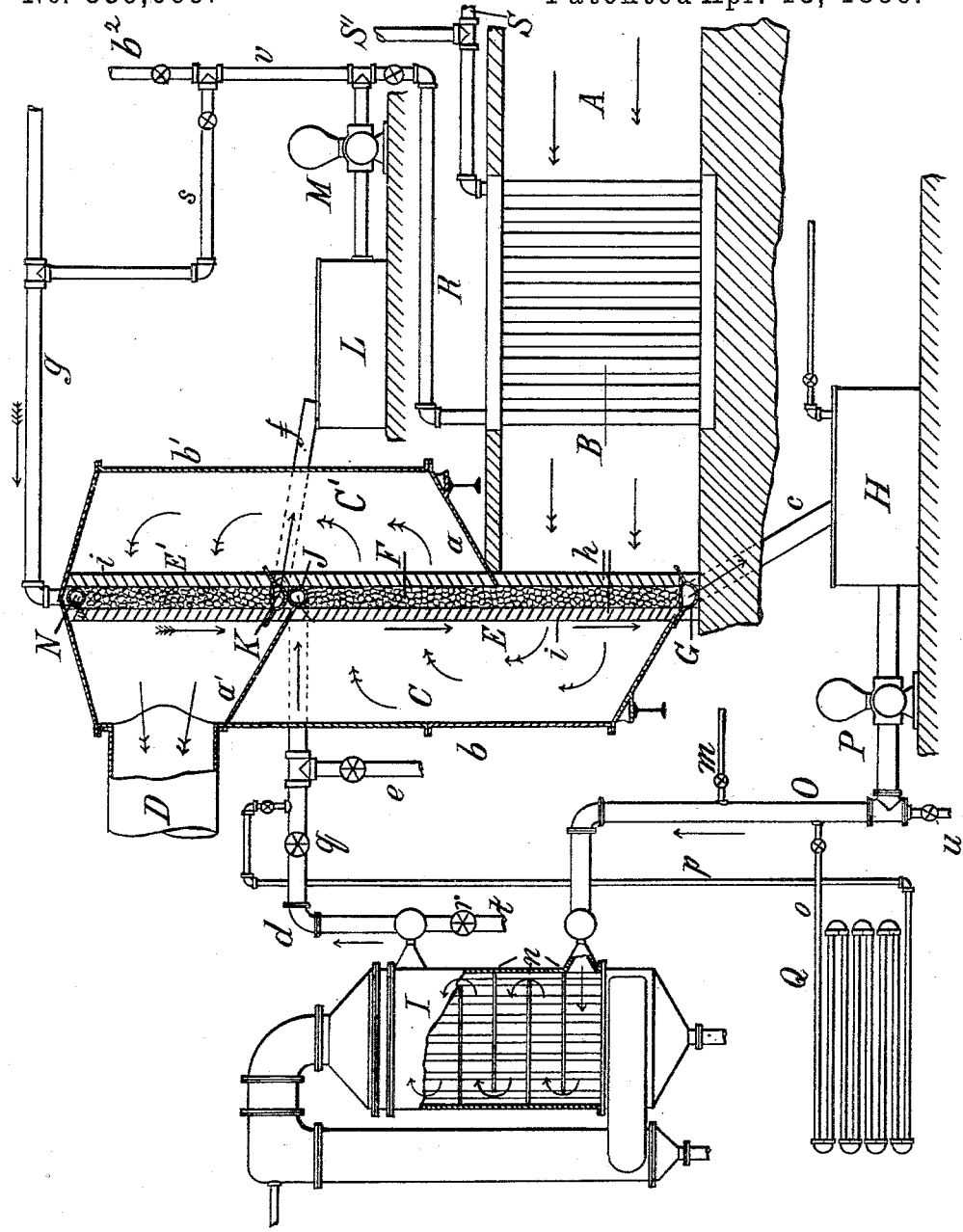
WITNESSES:
N. Neff.
S. J. Neff.
INVENTOR
S. Morris Lillie

UNITED STATES PATENT OFFICE.

S. MORRIS LILLIE, OF PHILADELPHIA, PENNSYLVANIA.

UTILIZING THE WASTE HEAT OF FURNACES.

SPECIFICATION forming part of Letters Patent No. 339,669, dated April 13, 1886.

Application filed January 8, 1886. Serial No. 188,017. (No model.)

*To all whom it may concern:*

Be it known that I, S. MORRIS LILLIE, a citizen of the United States, residing at Philadelphia, in the county of Philadelphia and State of Pennsylvania, have invented a new and useful Process and Apparatus for Utilizing the Waste Heat of Furnaces, of which the following is a specification, in which reference is had to the accompanying drawing.

The process consists in leading or forcing the gaseous products of combustion, first, through a surface-heater in which they heat water under pressure, then into intimate contact with a saline solution, which they heat and gradually evaporate and by which they are washed of their soluble and mechanical impurities, and then, more or less laden with water-vapor, into intimate contact with one or more portions of water, (solutions or liquids,) which they heat to a greater or less degree, and which, thus heated, is passed through the surface-heater above mentioned, and is heated therein to above 212° Fahrenheit, preparatory to being fed into steam-boilers or to being used for other purposes for which water (solutions or liquids) above 212° Fahrenheit is needed or is advantageous.

The saline solution heated and partially evaporated, as above described, by the products of combustion, is used in suitable apparatus for evaporating liquids and for heating purposes.

The objects in using the saline solution—which we will suppose to be one of common salt—for scrubbing or washing the gases, and as a conveyer of heat from the gases to the evaporating and heating apparatuses, instead of water, are, first, that owing to its boiling-point being above that of water it can be heated by the gases to a higher temperature, and consequently a higher temperature may be maintained in the evaporating and heating devices in which it is used; second, that by regulating its density the temperature of the solution and of the heating and evaporating operations carried on by it may be varied as desired within certain limits; and, third, that the evaporation caused by the gases in the saline solution reduces the same to a more or less concentrated brine, from which salt may be obtained by further evaporation.

In the drawing, A is a flue along which the products of combustion from a set of boilers flow.

B is a vertical tube-surface heater arranged in the flue in a manner familiar to steam users.

C is a vertical chamber, through which the products of combustion pass after leaving the surface-heater B to the main D, which latter leads to an exhausting fan or apparatus. (Not shown.) The chamber C contains a vertical wall, F, permeable to gases, which is parallel to the walls $b\ b'$ of the chamber, and which in the case shown is formed of broken stone, coke, or other suitable material contained between perforated supporting-walls E E'. This wall F, extending downward, covers the passage from the flue A into the chamber C, and upward, touches the top of the chamber and transversely touches the sides of the chamber, thus dividing the chamber into two compartments, C C', having no communication between them, excepting through the permeable wall.

Shelves or diaphragms $a\ a'$, reaching from side to side of the chamber, and extending at different altitudes and alternately from the front and back walls, $b\ b'$, to the wall F, form in the chamber C a circuitous conduit leading back and forth through the wall from the flue A to the main D, which latter leads to the exhausting apparatus.

The number of diaphragms $a$, and consequently the number of times the circuitous conduit leads back and forth through the permeable wall, may be varied. In the drawing two diaphragms, $a\ a'$, are shown, one on each side of the wall F. The coke of the lower two sections of the wall F rests on a grating covering the drain G at the bottom of the wall, which drain connects by the main $c$ with the tank H.

At or about the point of meeting of one of the diaphragms $a$ with the wall F a horizontal water-main, J, perforated on its under side, is located in the permeable wall, and, extending the entire length from side to side of the chamber C, connects through one wall of the latter with the main $d$, which in turn connects with the evaporating apparatus I or heating-coils Q, and with a salt-water main, $e$. Immediately above the perforated main J a second drain, K, is placed in the wall, upon whose perforated cover rests the coke of another, and in the case shown uppermost, section of the wall. This drain delivers through a pipe, $f$, into a tank from which a pump, M, draws and delivers through the surface-heater B. A main, N, perforated along its under surface, located at the top of the permeable wall and extending from end to end of the same, connects through the side wall of the chamber C with the main $g$, and through the pipe $s$ with the pump M.

The perforated walls E of the wall F are each formed, in the construction shown in the drawing, of horizontal slats $i$, supported at their extremities in suitable uprights, $h$, and inclining downward toward the coke or interior of the wall. These slats may, so far as supporting the coke is concerned, be without this inclination; but inclined, as shown, they serve to return to the coke any water that may spatter from the same, and in the case of the slats on the side from which the products of combustion leave the wall in passing through the same they serve to return to the coke water that may be carried from it by the momentum of the gases.

The drain G at the bottom of the coke wall delivers, as hereinbefore stated, into the tank H, from which the pump P draws and delivers through the main O into the case of evaporator I below the lower one of a series of partial partitions, $n$, which form in the interior of the case a circuitous channel, the lower end of which connects with the main O, while the upper extremity connects with the main $d$, which leads to the distributing-main J in the wall of coke. The pump P may also deliver through the pipes $o$ $m$, branching from the main O, to heating-coils Q, or to apparatus in which the hot saline solution may be used for heating rooms or for other heating purposes. From these heating coils or apparatus return-pipes—such as $p$—return the partially-cooled water from the said coils or apparatus to the perforated main J.

The operation of this apparatus is as follows: The exhausting-fan, (not shown,) to which the main D leads, is understood to be running and to be drawing the products of combustion from the furnaces of the boilers along the flue A, through the surface-heater B, and through the chamber C, back and forth through the permeable wall F. Water intended to be heated above 212° Fahrenheit is projected upon the top of the coke wall F along its entire length from the perforated main N, and flows down over the coke, keeping the latter thoroughly wetted, into the drain K, whence it flows into the tank L, from which it is drawn and forced by the pump M through the surface-heater B, from which it may be sent through the main S to the boilers or through the main S' to some other destination. Salt-water from the main $e$ is also projected onto the upper end of the lower two sections of the coke wall F, along its entire length, through the perforated main J, by the pump P, which draws the water from the hot-water tank H and forces it through the main O and branches $o$ $m$ to and through the evaporator I, radiators Q, and whatever other apparatus the hot salt-water may be used in, and thence through the return-pipes $d$ $p$, &c., to the perforated main J, from which, as before stated, it is projected onto the top of the lower two sections of coke, down which it flows, keeping it thoroughly wetted, into the drain G, and thence into the tank H, whence it runs its course again through the system, the pump P keeping up a constant circulation of the salt-water through the system. The products of combustion passing from the flue A first flow through the surface-heater, in which they heat the feed-water (delivered to the heater already more or less heated by the coke wall) to a temperature approximating or possibly exceeding that of the water in the boilers, then back and forth through the coke in the lower two sections of the coke wall, heating the salt-water flowing down over the coke, and at the same time being washed thereby, then through the coke of the upper section of the wall, heating to a degree the fresh water flowing down over the same, the said water condensing the vapors generated by the products of combustion in passing through the lower sections of the coke wall, and finally they pass from the chamber C, more or less cooled, through the conduit D to the exhausting apparatus. (Not shown.) The salt-water heated in the lower sections of the coke wall takes the courses hereinbefore indicated, producing evaporation in the evaporating apparatus I and heating effects in the radiators Q, and in any other apparatus in which it may be used, and finally returns, more or less cooled, through the various return-pipes—such as $d$ $p$—to the coke wall, to be therein heated again prior to a further trip through the system. Evaporation and concentration of the salt-water circulating through the system is constantly in progress, caused by the intimate contact of the same with the hot products of combustion while flowing down the coke wall.

To maintain the circulating brine at a constant density, fresh salt-water is constantly introduced into the system from the salt-water main $e$, while concentrated brine is continuously withdrawn from it through the pipe $p$, and by properly regulating the flow of fresh salt-water into the system and of the escape of the concentrated brine from it the density, and consequently the temperature, of the circulating brine may be maintained at anything desired within certain limits, and also the temperature of the operations in which the heated brine is used as the heating agent. The circulating brine, acting in the coke wall as a washing agent to the products of combustion, absorbs from the latter more or less of its dust and soluble gaseous constituents, the former of which may be separated from it by interposing a filter in the path of the brine—say between the pump P and the evaporator I— in which filter will be collected the dust or solid matters suspended in the brine. When such a filter is not used, the circulating brine may in time become so foul as to require renewal, in which event the system is emptied of the foul brine through the pipe *t* and draining-pipe *u*, and a new stock of salt-water is introduced from the main *e*. The concentrated brine which flows continuously from the pipe *t* may, after filtration, be further evaporated and salt obtained. If no use can be made of concentrated brine and its continuous production is therefore not desirable, the density of the brine circulating through the system being of the degree desired, it may be maintained at that point by introducing fresh water, instead of salt-water, into the system through the main *e* in such quantities as to replace the water lost by the brine through evaporation. By this procedure a continuous production of brine will be avoided and the desired density of the brine in the system still be maintained. The water heated in the upper section of the coke wall by the washed gases and the water-vapors from the lower or scrubbing sections of the wall collects in the drain K, and thence flows into the tank L, whence it is drawn by the pump M and sent either through the main R to and through the surface-heater B or through the pipe *s* to the perforated main N and back onto the coke wall again or through the main $b^2$ to apparatus in which this water heated by the washed gases may be used for some useful purpose. The water returned through the pipe *s* to the coke wall adds to the volume of water delivered from the main N upon the coke wall and aids in keeping the latter thoroughly wetted when the quantity necessarily flowing down the coke to supply the demand through the mains R *r* would be inadequate to the purpose. This return-water could be made to serve a heating purpose by passing it through a heating apparatus of some kind—such as an evaporator, I, for example.

The water sent by the pump M through the surface-heater B may be led from the surface-heater through the pipe S into the boilers or through the main S' for use in processes requiring water above 212° in temperature.

The coke wall and the mechanism described may be considered, independently of the evaporator I, as an apparatus for utilizing the heat in the products of combustion from furnaces for evaporating liquids or concentrating solutions. For example, in the above-described case, salt-water enters the system through the main *e* and leaves it concentrated to brine or to any degree desired by the pipe *t*.

The construction and arrangement of this apparatus may be varied without departing from the nature of my invention. For example, the sections of the coke wall, instead of being placed over each other vertically, and so forming a single wall, through which the products of combustion pass back and forth from one side to the other, may be placed in a line in the flue one after the other, forming so many coke walls, through which the gases flow horizontally in a straight line. The former arrangement requires more room vertically and less room horizontally than the latter. Again, the wall may be constructed variously. It may consist of broken coke, stone, or other material supported between walls containing passages for the gases to flow through, or it may consist of a wall of material (such as a perforated metal wall covered with a wire screen) permeable to the gases, the face or faces of which are kept moistened by a film of water flowing down the same.

Thus having described my invention, I claim as mine and wish to secure to myself by Letters Patent of the United States—

1. Apparatus for utilizing the heat in the gaseous products of combustion from the furnaces of boilers, &c., consisting of a wall permeable to the gases, located across a flue along which the gases are made to pass, suitable apparatus for causing a flow of the gases along the flue and through the permeable wall, means for projecting water or other liquid upon the wall and keeping it wetted, and apparatus for receiving the heated water or liquid flowing from the permeable wall and for utilizing it for heating or evaporating or for other purposes for which heated water may be used, substantially as specified.

2. The within-described apparatus for utilizing the heat in the gaseous products of combustion from furnaces for heating water or for evaporating solutions or liquids, consisting of a wall permeable to the gases placed across the flue along which the gases are made to pass, means for projecting water or liquid to be heated or evaporated upon the permeable wall, and a drain or suitable means for receiving and collecting the heated water as it flows from the wall, substantially as specified.

3. Apparatus for utilizing the heat and the gaseous products of combustion from furnaces, consisting of two or more sections of wall, or of two or more walls permeable to the gases located in the flue for the gases, apparatus for exhausting or forcing the gases along the said flue and successively through the sections of permeable wall, means independent for each section of wall for projecting water or liquid upon the same, and drains independent for each section of wall for collecting the heated liquid flowing from each, the arrangement permitting the heating of different liquids on the different sections or walls, or of heating the same liquid for different purposes, substantially as specified.

4. Apparatus for utilizing the heat in the gaseous products of combustion from the furnaces and boilers, &c., consisting of a vertical chamber, with which the flue from the furnace connects, an approximately-vertical wall permeable to the gases in the said chamber, shelves or deflecting-plates, such as *a*, extending from the wall alternately to opposite sides of the chamber and dividing the said chamber into a zigzag channel leading back and forth through the permeable wall, a flue leading from the furnace and connecting with one end of the zigzag channel in the chamber, an exhausting apparatus communicating with the other end of the zigzag channel and operating to draw the gases from the furnace to and through the zigzag channel, and means for projecting a liquid to be heated or evaporated upon the said permeable wall, substantially as specified.

5. The combination, with the permeable wall of an evaporator, constructed and operating substantially as described, of a pump or its equivalent, with suitable mains connecting it with the permeable wall, the pump and its connecting-mains operating to collect the partially concentrated or evaporated liquid flowing from the wall and to deliver it back onto the wall for further evaporation, substantially as specified.

6. The within-described apparatus for utilizing the heat in the gaseous products of combustion from the furnaces of boilers, kilns, &c., consisting of a permeable wall located across a flue, along which the products of combustion are made to pass, a perforated main or its equivalent for distributing a liquid upon the permeable wall, a drain or receptacle for receiving the liquid flowing from the wall, evaporating or heating apparatus connected with the said perforated distributing-main and with the said drain or receptacle by suitable connecting-pipes, and apparatus—such as a pump—for causing the flow of the liquid from the said drain or receptacle through the evaporating or heating apparatus to the said perforated distributing-main for the permeable wall, substantially as and for the purpose specified.

7. The within-described process of concentrating solutions or evaporating liquids to a certain degree by the gaseous products of combustion from the furnaces of boilers, &c., consisting in causing the solution or liquid to flow repeatedly over a permeable wall, through which the hot products of combustion from the furnaces are made to pass, substantially as specified.

8. The within-described process of continuous evaporation or concentration of liquids or solutions by means of the hot gaseous products of combustion from the furnaces of boilers, &c., consisting in causing the solution to flow repeatedly over a wall permeable to the gases, through which the gases are made to pass, in continuously adding the fresh and dilute solution to the circulating and evaporating solution, and in continuously drawing off the concentrated solution from the said circulating solution, the rate of introduction of the fresh solution and of the withdrawal of the concentrated solution being so regulated that the concentrated solution continuously drawn off may be of the desired density, substantially as specified.

9. The within-described process of utilizing the heat of the gaseous products of combustion from the furnaces of boilers, &c., for evaporating liquids, consisting in heating water or a saline solution, and in using the heated water or solution in an evaporator as the source of heat for effecting the evaporation, substantially as specified.

10. The within-described process of utilizing the heat of the gaseous products of combustion from the furnaces of boilers, &c., for evaporating liquids, consisting in heating water or a saline solution, in using the heated water or solution in an evaporator as the source of heat for effecting the evaporation, and in returning the partially-cooled water from the evaporator to the heating device, the water thus circulating through the system acting as a conveyer of heat from the products of combustion to the evaporator, substantially as specified.

11. In the process and apparatus, substantially as described, for utilizing the heat in gaseous products of combustion for the evaporation of solutions, and for other heating purposes, the use of a saline solution as the conveyer of heat from the products of combustion to the evaporator or heating apparatus, the use of such solutions permitting the conveyance of higher temperatures, substantially as specified.

12. In the process for evaporating by means of the gaseous products of combustion from furnaces herein described, the maintenance of a constant density, and consequently of a constant temperature in the saline solution used as a conveyer of the heat from the products of combustion to the evaporator, by admitting fresh water to the saline solution to replace the water lost from the same by evaporation, substantially as specified.

13. Apparatus for utilizing the heat in the gaseous products of combustion from the furnaces of boilers, kilns, &c., consisting of the combination, in the flues or conduits along which the hot products of combustion are made to pass, of a surface-heater, such as B, a water-scrubber, such as F, and suitable connecting-main, the water-scrubber serving to heat water to a degree preparatory to its being passed through and superheated in the surface-heater, substantially as specified.

S. MORRIS LILLIE.

Witnesses:
N. NEFF,
S. J. NEFF.